United States Patent
Babbitt et al.

(10) Patent No.: US 6,212,816 B1
(45) Date of Patent: Apr. 10, 2001

(54) REMOTE CONTROLLED ANIMATED DECOY

(76) Inventors: Gary D. Babbitt, 2315 Claremont Dr., Boise, ID (US) 83702; Randy Witt, 10350 W. Amity Rd., Boise, ID (US) 83709; Larry Dowen, Rte. 10, Box 104, Caldwell, ID (US) 83605

( * ) Notice: Subject to any disclaimer, the term of this patent is extended or adjusted under 35 U.S.C. 154(b) by 0 days.

(21) Appl. No.: 09/071,416

(22) Filed: May 1, 1998

(51) Int. Cl.⁷ ............................................ A01M 31/06
(52) U.S. Cl. .................................................... 43/3
(58) Field of Search ................................... 43/2, 3

(56) References Cited

U.S. PATENT DOCUMENTS

| | | | | |
|---|---|---|---|---|
| 2,575,252 | * | 11/1951 | Berger | 43/3 |
| 2,576,209 | * | 11/1951 | Berger | 43/3 |
| 3,689,927 | * | 9/1972 | Boston | 43/3 |
| 4,658,530 | * | 4/1987 | Ladehoff | 43/3 |
| 4,885,861 | * | 12/1989 | Gazalski | 43/3 |
| 5,036,614 | * | 8/1991 | Jackson | 43/3 |
| 5,168,649 | * | 12/1992 | Wright | 43/2 |
| 5,233,780 | * | 8/1993 | Overholt | 43/3 |
| 5,884,427 | * | 3/1999 | Lenz | 43/2 |
| 5,926,990 | * | 7/1999 | Okimoto | 43/2 |
| 6,070,356 | * | 6/2000 | Brint et al. | 43/2 |

* cited by examiner

*Primary Examiner*—Kurt Rowan (57) ABSTRACT

A remote controlled animated bird decoy including a body and an oscillating mechanism to simulate horizontal life-like movements. An oscillating mechanism oscillates the bird decoy body and includes a battery-operated motor which is remote controlled. A sensory device with memory programmed to provide oscillatory motion is connected to the motor which provides, in turn, horizontal oscillatory motion of the bird decoy body so that the bird decoy body oscillates in a horizontal plane in relation to the ground surface simulating a turning movement of a live bird. A full body, shell or silhouette bird decoys of prior art can be adapted or modified to include the oscillating mechanism and turn or oscillate like a live bird.

12 Claims, 13 Drawing Sheets

REMOTE CONTROLLED ANIMATED DECOY

BACKGROUND OF THE INVENTION

1. Field of the Invention

The present invention relates generally to devices for attracting game animals, and more particularly to animated decoy devices especially adapted for attracting waterfowl.

2. Description of the Prior Art

Decoys presently available typically include silhouette decoys, windsock decoys, shell decoys, and full body decoys. Windsock decoys are popular where movement is desirable to give the appearance of movement like a live bird. When prevailing wind conditions are favorable the windsock decoys are inflated by the wind simulating the appearance of a full body bird. Too much wind will damage the windsock fabric or the fabric attachment to its head. The effectiveness of windsock decoys are dependent on unpredictable wind.

Most decoys, with the exception of windsock decoys, are stationary objects which give a visual appearance of a bird. However, such stationary decoys are not realistic because real animals move. In this respect, it would be desirable for an animal decoy to move in a lifelike manner, rather than be stationary.

Of special interest are decoys which simulate waterfowl, such as ducks and geese, for hunting and to attract live birds or for other uses, including aesthetic purposes such as display, gardens, and lawns. In the prior art, waterfowl decoys are known which have wings or heads that are mechanically moved by pulling a string. For a more realistic decoy, it would be desirable if a waterfowl decoy body oscillated horizontally imitating a live bird. That is, a decoy, which turned from one position to another or oscillated from one position to another or any variation thereof would be more lifelike. Rather than a decoy being animated by unpredictable wind or controlled or animated by strings or chords which tangle in or snag on shrubs, bushes, or other objects, it would be desirable for an animated animal decoy to be powered by a motor and remotely controlled by a human operator.

Throughout the years, a number of innovations have been developed relating to waterfowl decoys. The following U.S. patents are representative of some of those innovations: U.S. Pat Nos. 4,172,335; 4,611,421; 4,753,028; 4,885,861; 4,928, 418; and 5,172,506. More specifically, U.S. Pat No. 4,172, 335 discloses a goose decoy that has no wings and is immobile when used. Leg assemblies have been employed to support decoys upright. U.S. Pat. No. 4,658,530, by Ladehoff, U.S. Pat. No. 4,885,861, by Gazalski, and U.S. Pat. No. 5,205,060, by Franceschini, disclose various types of leg assemblies which support a decoy in an upright, stationary position. These leg assemblies are hereinafter referred to as a "plug-in leg assembly.

U.S. Pat. No. 2,441,753 to Carpenter on May 18, 1948 shows a single panel type decoy mounted like a weather vane on a vertical shank of a stake for turning in the wind. The pivot shank theory is also shown in U.S. Pat. No. 2,711,608 which issued to Fulster Jun. 28, 1955. In Aug. 6, 1991 U.S. Pat. No. 5,036,614 issued to Jackson which included a pivoting mechanism to pivot or oscillate the decoy body in a vertical plane to imitate a feeding action with the supporting assembly which pivots manually to present a high profile to game birds of the feeding action. U.S. Pat. No. 5,168,649, by Wright, discloses the posture of a hen turkey decoy, whereby the turkey decoy drops vertically downward in a nonpivotal fashion. U.S. Pat. No. 5,036,614, by Jackson, discloses a decoy which pivots in a vertical plane. U.S. Pat. No. 5,233,780, by Overholt, discloses a remotely controlled turkey decoy which produces sound and movement in one circular direction. U.S. Pat. No. 3,689,927, by Boston, disclosed a motorized, propeller driven decoy for movement in the water. U.S. Pat. Nos. 2,576,207 and 2,575,252, by Berger, disclose a bird decoy with flapping wings and turning head.

SUMMARY OF THE INVENTION

The principal objects of the present invention are to provide an animated bird decoy and to provide a portable apparatus easily mounted to bird decoys of prior art to animate such decoys and to provide an apparatus easily incorporated into the manufacture of silhouette, shell and full body bird decoys giving a more life-like appearance to the decoy through horizontal oscillatory motion.

In accordance with one object of the invention, a plug-in leg assembly of a bird decoy of prior art is modified by incorporating a oscillatory mechanism and plugging the adapted plug-in assembly into the decoy. The oscillating mechanism is also incorporated into the stand or support assembly of a silhouette or shell decoy to imitate horizontal motion of a live bird on the ground either in a feeding or sentry position.

In accordance with one object of the invention, decoys are manufactured by incorporating a oscillatory mechanism into a simple panel or silhouette decoy, a shell decoy or adapting a plug-in leg assembly to incorporate an oscillatory mechanism for mounting to a decoy with features receive a plug-in leg and foot assembly to imitate horizontal motion of a live bird.

The present invention includes a portable oscillatory mechanism which is mounted in a housing and includes a remote radio controlled switch and receiver, a power supply, a programmed sensor device with a memory, a motor with rotating shaft, which turns the decoy body.

The present invention includes a power supply such as wet or dry cell batteries to power a motor with a rotating shaft. The switch and receiver are also attached to an auxiliary power supply such as wet or dry cell batteries. The power supply is connected to a sensor device with a memory. The rotating shaft has an axis of rotation which is the same as the axis of the rotation of the bird decoy body. The sensor device has a memory element programmed for predetermined rate and degree of rotation or counter-rotation or oscillation of the motor's rotating shaft which in turn oscillates or rotates the body in a horizontal plane imitating movement or turning actions of a live bird.

The invention also includes a rotating shaft which extends vertically through an opening in the top of the housing and supportive device and is operatively connected to a plug-in apparatus having plug-in features of a plug-in leg assembly which, in turn, plugs into a full body bird decoy. The plug-in apparatus includes a bearing to pivot the plug-in apparatus and decoy on top of the housing. The plug-in apparatus is of variable size, shape and features in order to plug into full body decoys of prior art with plug in or attachable foot stands including Carry Lite, Herters Model 599 and the like.

Another embodiment of the invention attaches to decoys with a shell body or hollow interior and to silhouette decoys. In another embodiment of the invention, the power supply is activated by a manual switch mounted on the housing or connected to an electrical wire of selective length for remote manual operation.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved animated animal decoy which has all of the advantages of the prior art and none of the disadvantages and may be incorporated into bird decoys of prior art.

It is another object of the present invention to provide a remote controlled oscillatory mechanism for animal decoys which may be easily and efficiently manufactured and marketed.

It is another object of the present invention to provide a oscillatory mechanism for animal decoys which may be easily and efficiently manufactured and marketed.

It is a further object of the present invention to provide a oscillatory mechanism for animal decoys which is of durable and reliable construction.

An even further object of the present invention is to provide a oscillatory mechanism for animal decoys which is susceptible of a low cost of manufacture with regard to both materials and labor, and which accordingly is then susceptible of low prices of sale to the consuming public, thereby making such animated animal decoy available to the buying public.

Still yet a further object of the present invention is to provide a oscillatory mechanism for animal decoys which has a variety of horizontal movements rather than being immobile and which is remotely controlled.

Still a further object of the present invention is to provide a new and improved animal decoy apparatus which has horizontal motion which does not depend upon the wind or manual power.

Yet another object of the present invention is to provide a new and improved animal decoy apparatus that is remotely controlled by a human operator.

Still another object of the present invention is to provide a new and improved animal decoy apparatus which employs radio waves for receiving remote control signals.

These together with still other objects of the invention, along with the various features of novelty which characterize the invention, are pointed out with particularity in the claims annexed to, and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION OF THE INVENTION

Figure 1:
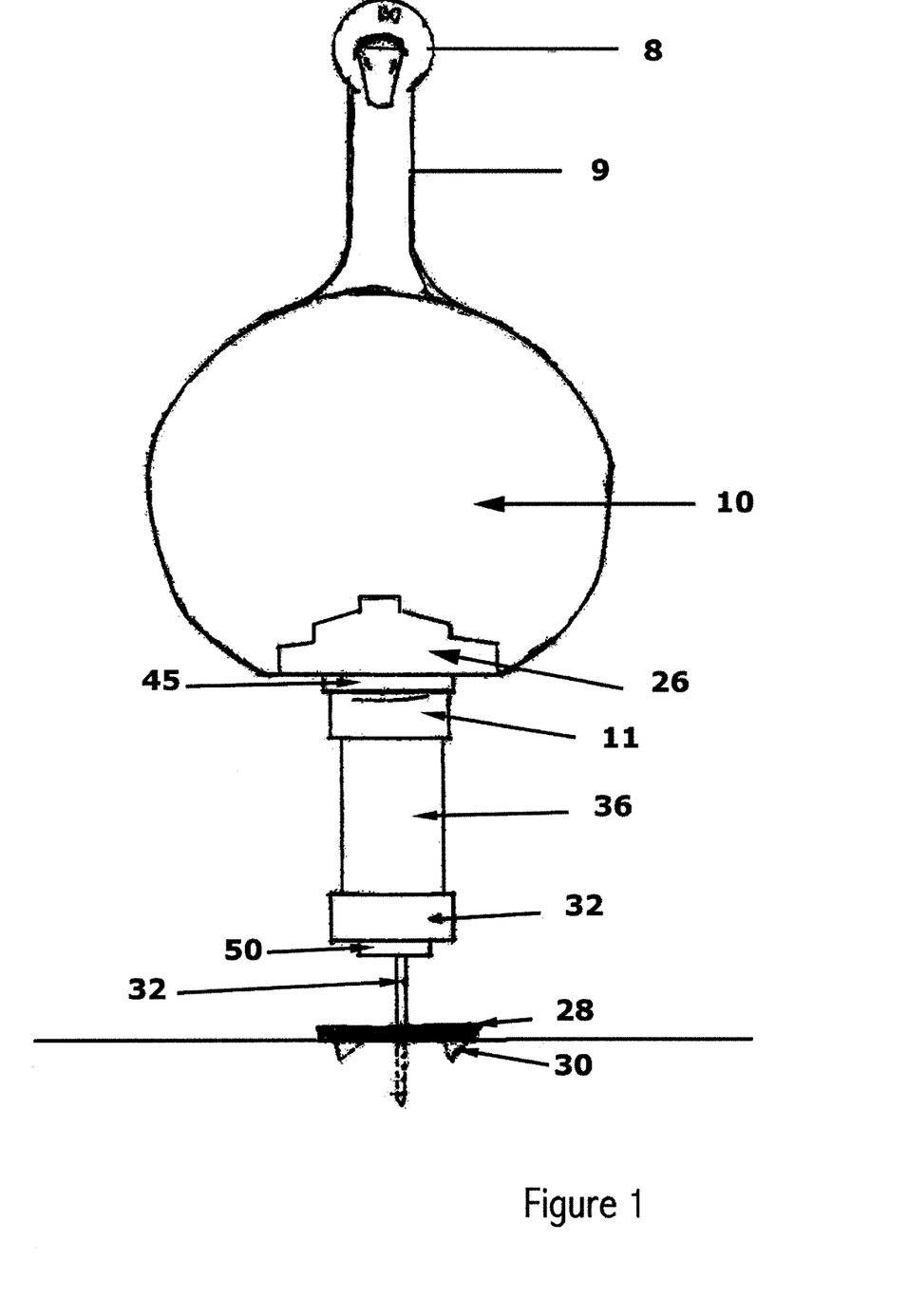
FIG. 1 is a perspective view of a bird decoy mounted on a housing and support device.

In the following description it is to be understood that such terms as or references to duck decoy or goose decoy are words of convenience and are not to be construed as limiting terms. Referring to a bird decoy and particularly FIG. 1 is a full body goose decoy indicated by the numeral 10 attached to an adapted plug-in leg apparatus 26 mounted on a housing and support device 36 illustrating an embodiment of the invention. The bird decoy 10 in FIG. 1 is an upright or standing position having a head 9 and a neck 8. In FIG. 1, the bird decoy 10 oscillates horizontally under the influence of an oscillatory mechanism 37 mounted inside a housing and support device 36. The present bird decoy is more useful in imitating a bird on the ground by mimicking bird feeding or sentry motion with oscillating turns 30° to 180°.

Figure 10:
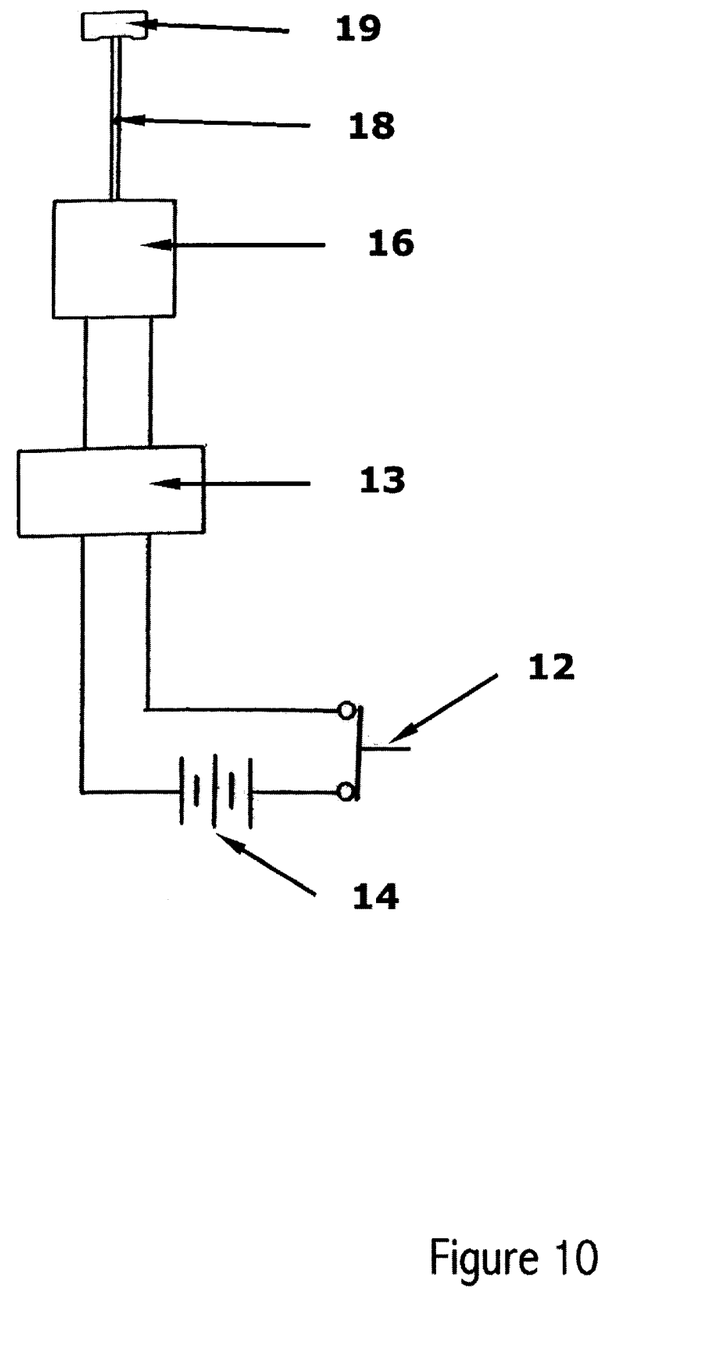
FIG. 10 Electronic and Circuit Schematic with manual switch.

The embodiment of the invention includes a manual switch 12, or a switch with a receiver 13 activated by radio waves or the like connected operatively to a power supply 14 comprised of either dry or wet cell batteries which, in turn, is connected operatively to a sensor device with memory 15 comprising an automatic electronic reverse polarity switch having selective settings which reverses the rotation of and which is operatively connected to an electric gearhead motor 16 or to a servo having reversible rotation, having not less than 3.0 voltage, not less than 0.2 rpm but having stall torque more than 2.4, such as hat made by Hankscraft Motors or found in the Tower Hobbies catalog or Edmund Scientific Catalog. The electric motor 16 has a rotating shaft. 18 The power supply 14 is not less than two size D batteries. The switch with a receiver 13 is powered by an auxiliary power supply. 41 In FIGS. 10 and 11 the schematic electronic and electrical setup for the invention are illustrated.

Figure 2:
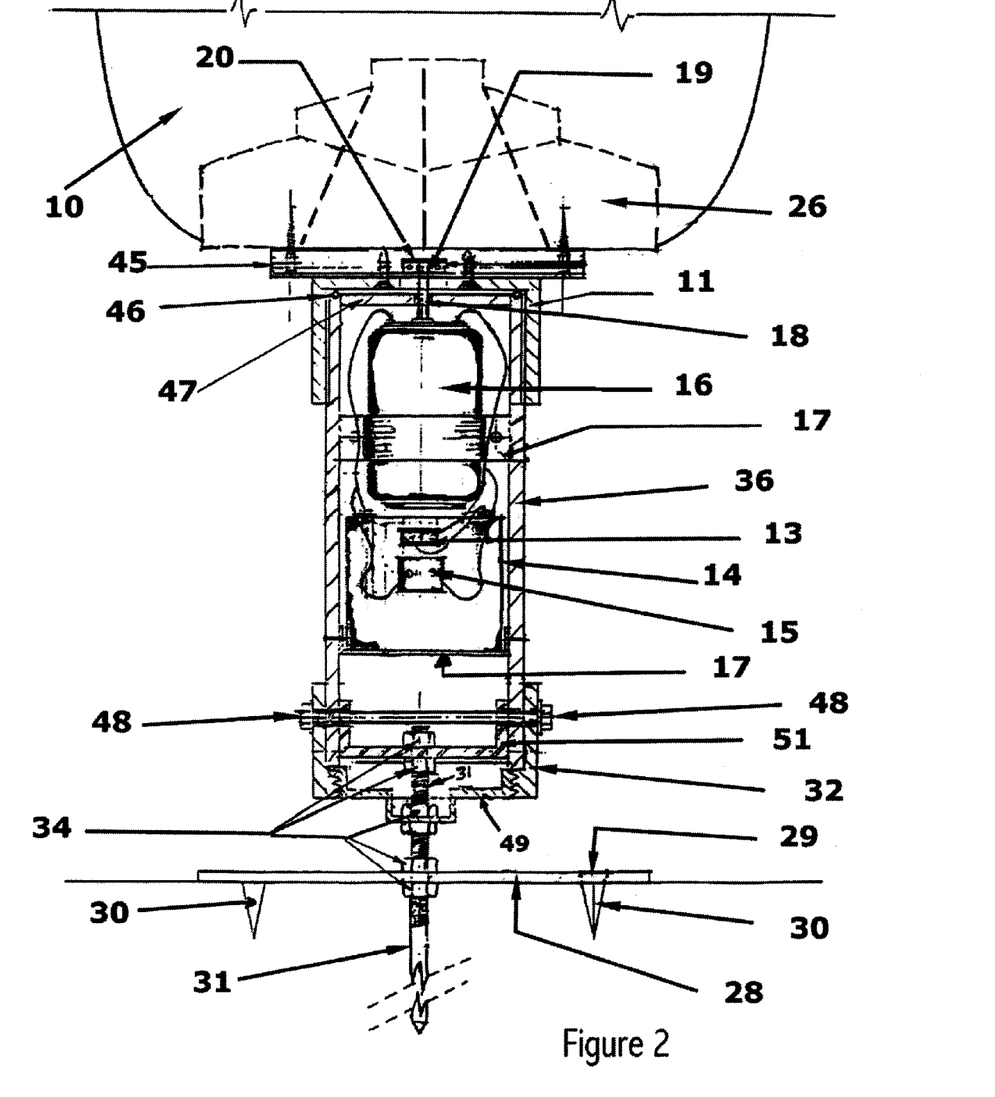
FIG. 2 is a side cross section view showing the oscillatory mechanism with remote switch and base apparatus.
Figure 11:
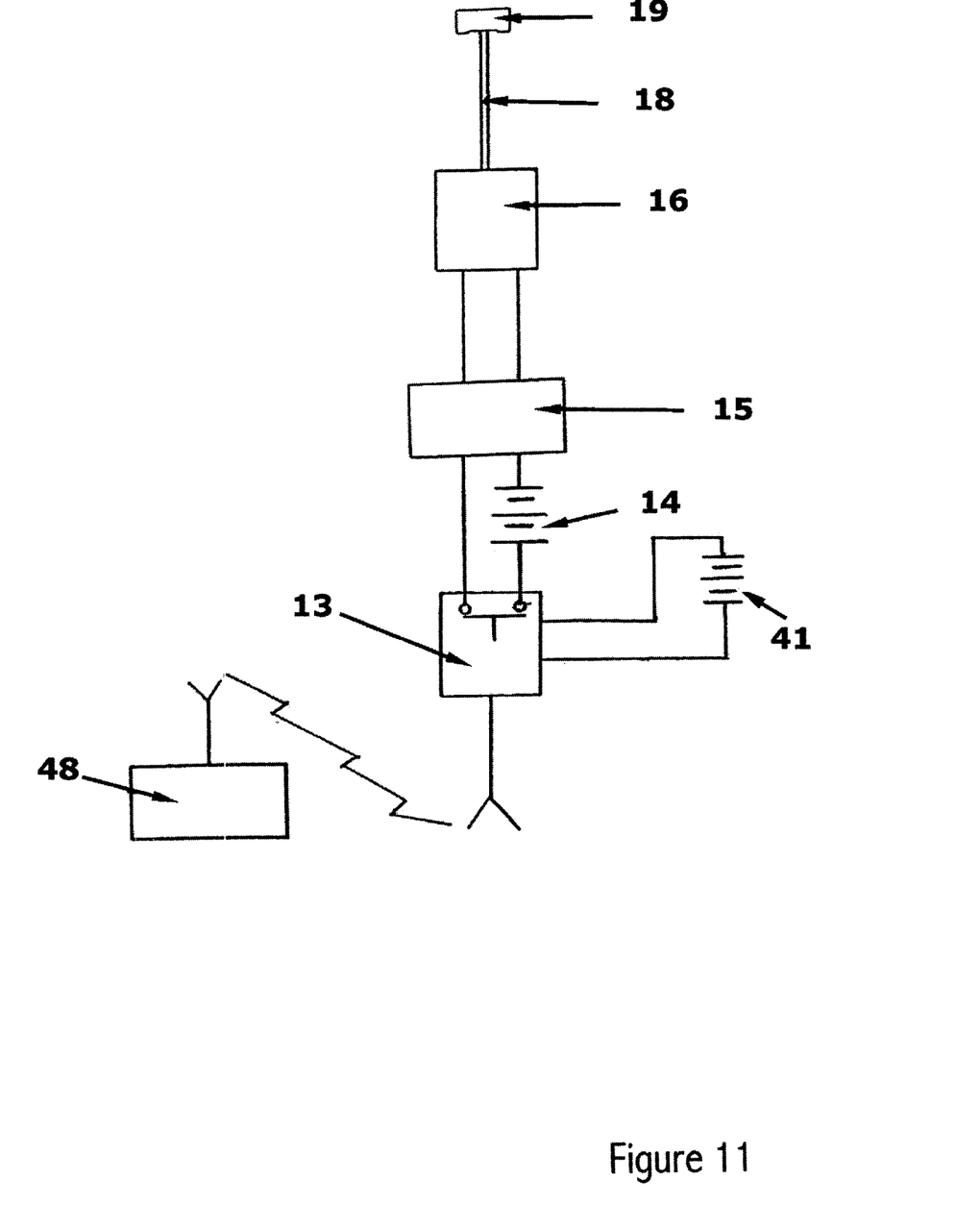
FIG. 11 Electronic and Circuit Schematic with radio activated switch.

FIG. 2 illustrates an embodiment of the invention with the power supply 41, sensor device with memory 15, switch with receiver 13, and power supply 14, and motor 16 are mounted fixedly inside a housing 36 on supporting members 17, collectively comprising the oscillatory mechanism 37. The sensor device with memory 15 activates and controls the degree and direction of oscillation of the motor 16, thereby controlling the rate and degree of the oscillation of rotating shaft 18, which in turn selectively oscillates or rotates the decoy body horizontally. A sensor device with memory 15 controls the rate and degree of oscillation of the rotating shaft 18. In FIG. 11 there is illustrated the remote control device 48.

Figure 3:
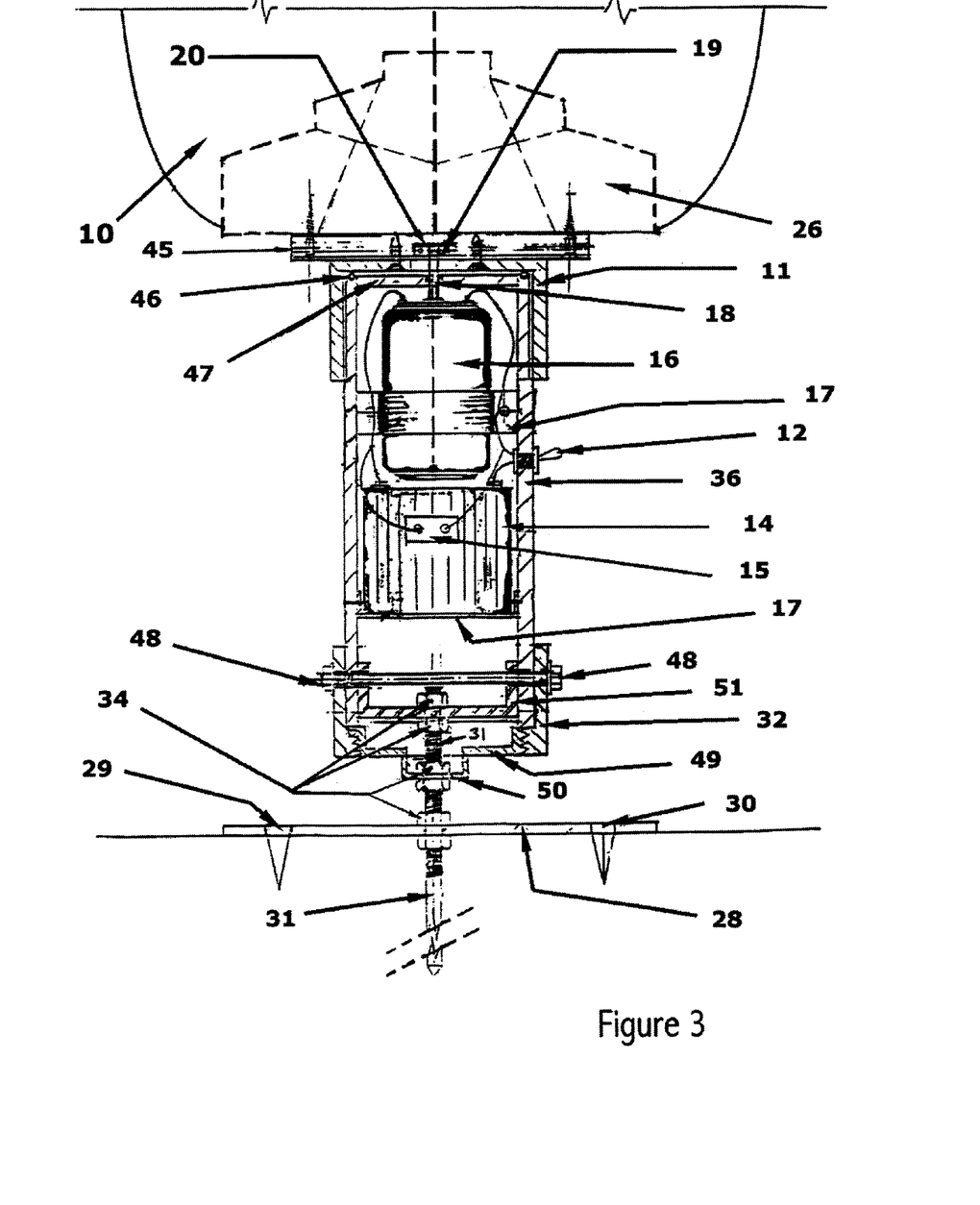
FIG. 3 is a side cross section view showing the oscillatory mechanism with manual switch and base apparatus.
Figure 3A:
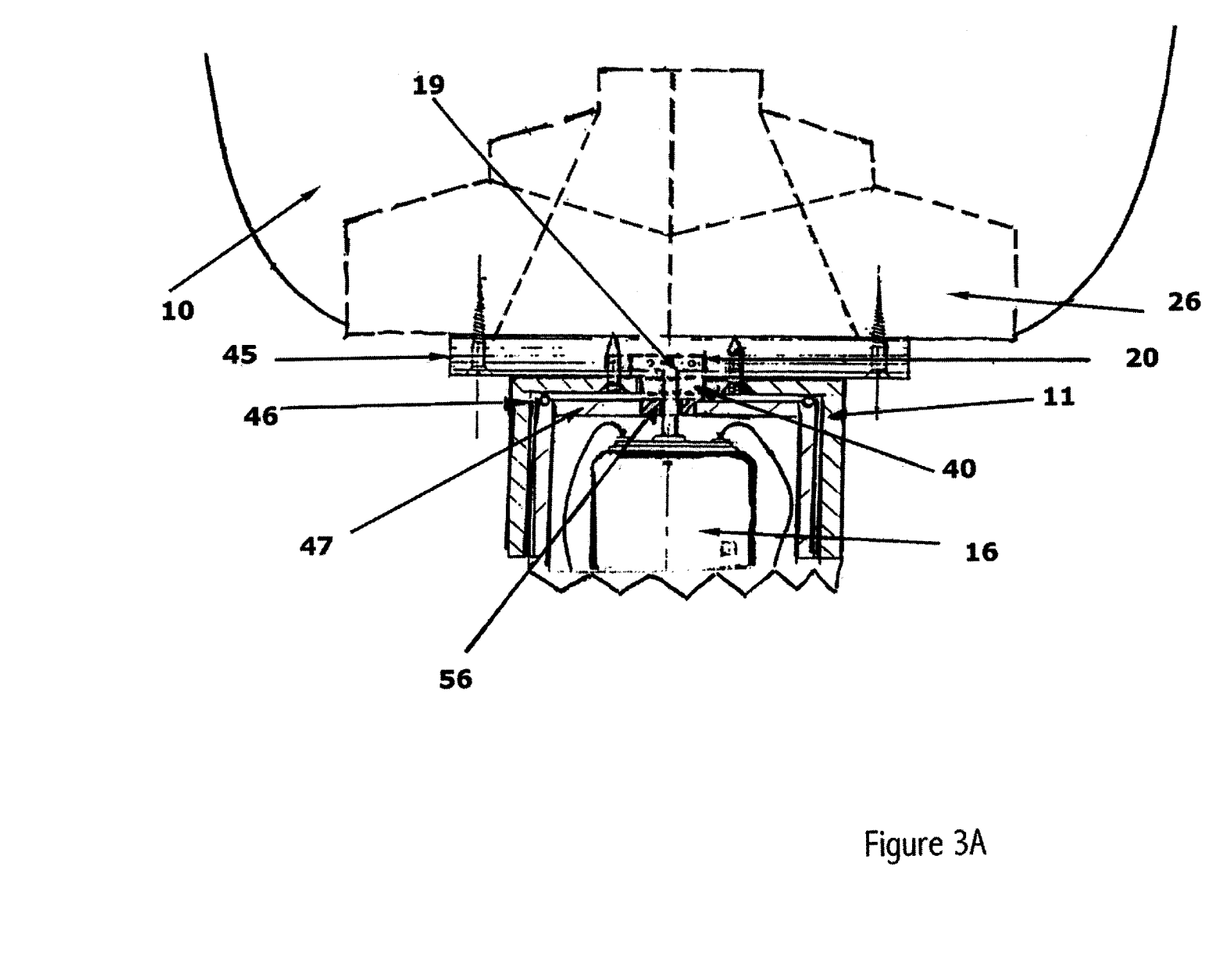

FIG. 3 illustrates a further embodiment of the invention with a manual switch. 12

Figure 4:
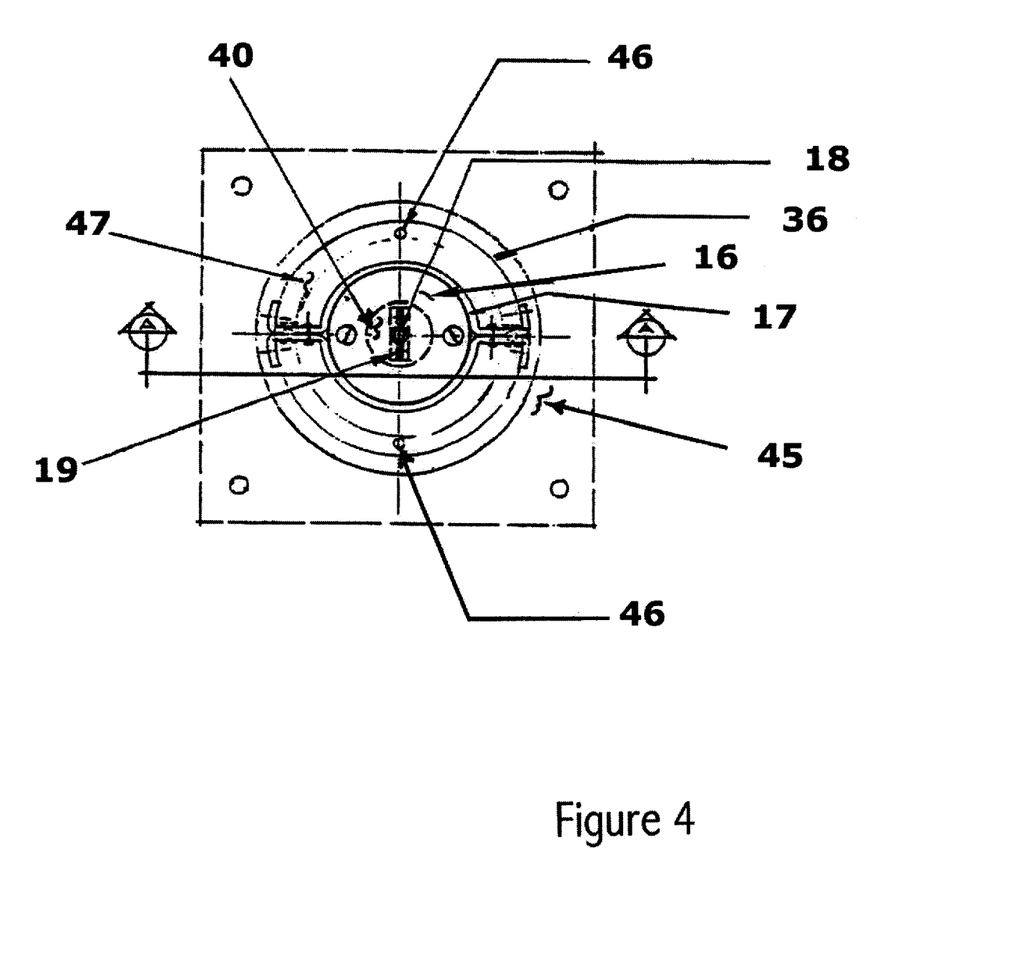
FIG. 4 is a plan view of the antifriction device and the top of the housing and support device.
Figure 5:
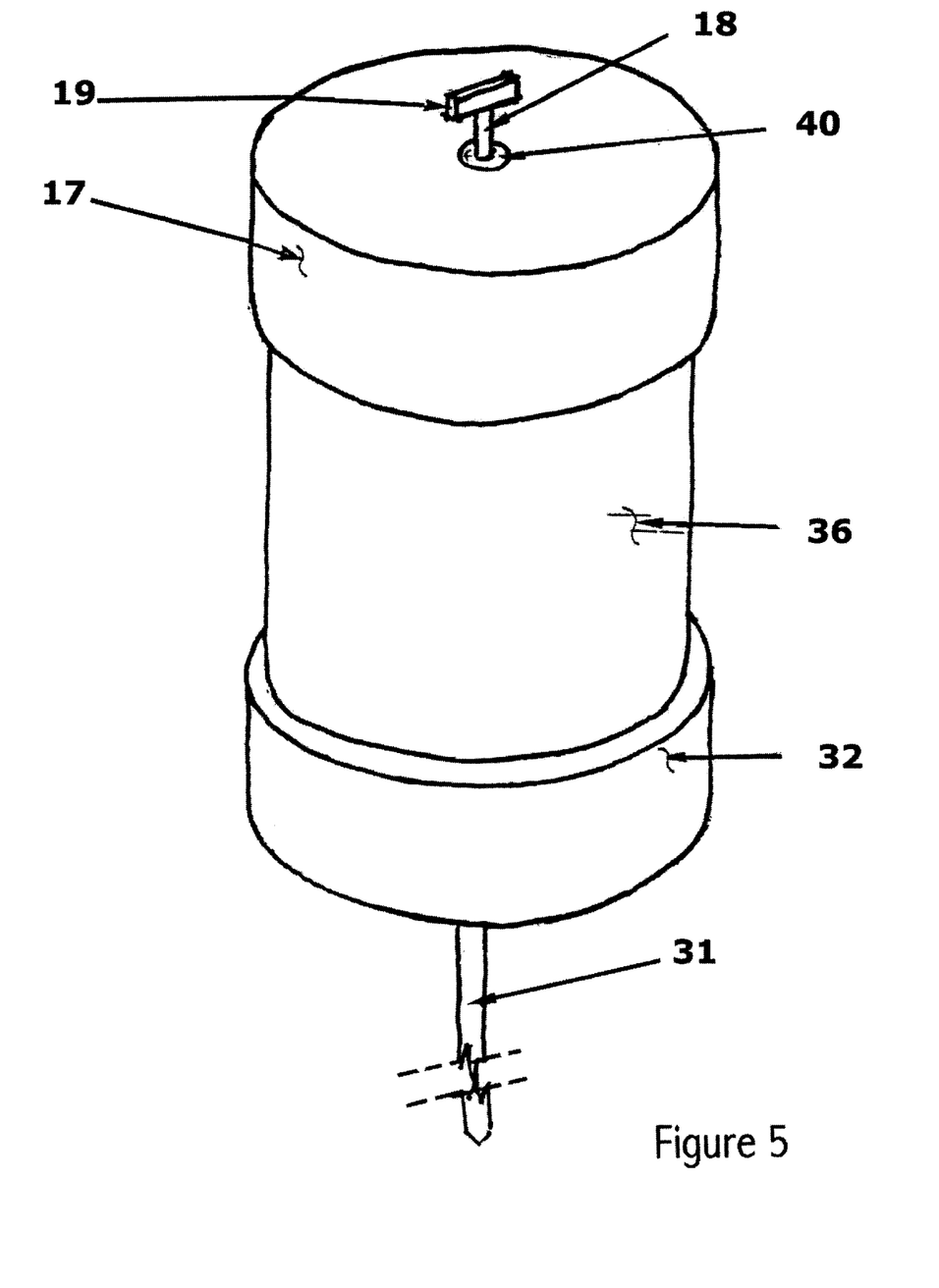
FIG. 5 is an exploded side elevational view of the housing and support device with the antifriction device and rotating shaft with geometrical member.

In FIGS 2, 3 and 5, the rotating shaft 18 extends through a bushing 52 mounted in the top end member 47 of a housing and support device 36, a antifriction device 11 mounted operatively on the housing 36. In FIG. 5, the rotating shaft 18 extends vertically through an opening 38 in the top of the antifriction device 11. In FIG. 4 the geometrically shaped member 19 at the terminal end of the rotating shaft 18 fits slidably into a matching slot 20 in the mounting plate 45 mounted on the top of the antifriction device 11. The mounting plate 45 then is attached to the plug-in apparatus 26 (FIGS. 1, 2, 3). The plug-in apparatus 26 then as shown in FIGS. 1, 2, 3, plugs into a full body decoy.

In an embodiment of the invention as shown in FIGS. 2 and 3, the antifriction device 11 operatively mounts on a plurality of ball bearings 46 in the top end member 47 of the housing and support device 36. The antifriction device 11 facilitates oscillation of the decoy.

By way of further explanation, the top of the antifriction device 11 is attached to a mounting plate 45 which is, in turn, attached to the bottom of the plug-in apparatus 25. It will be understood in the art that the plug-in apparatus varies 26 in size, shape, and features in order to plug-in to different sizes and models of full body decoys with plug-in foot assemblies.

It will be understood by those in the art that the axis of the horizontal oscillation of the decoy body is the same as the axis of the oscillation of the rotating shaft 18.

In FIGS. 2, 3 and 5 the base end apparatus 32 slides over the bottom end of the housing and support device 36. The base end apparatus 32 is attached to the housing and support device by a fastener 48 including a bolt or screw, and is connected to a structural member 51 reinforcing the inside of the housing and support device 36. In a further embodiment of the invention, the base end apparatus includes a base lid 49 which screws into the bottom of the base end apparatus 32. In an embodiment of the invention, the base end lid 49 also includes a knob 50 to facilitate turning the base end lid.

In an embodiment of the invention, a base plate 28, larger than the housing and support device 36 is adjustably secured to the base end apparatus 32 by means of a threaded main spike 31 and a series of threaded nuts 34. In FIG. 3, the base plate 28 is perforated with a multiplicity of holes 29 for the insertion of spikes or stakes 30 to be inserted by manual pushing or hammering into the ground. The base plate 28 has a threaded main spike 31 extending vertically downward approximately through the center of the base lid 49 to the ground and extending vertically upward through an opening approximately in the center of the top of the housing and support device 36. The main spike 31 is adjustably secured by threaded nuts 34 at its intersection or bottom of base lid 49, the structural base member 51, and the base plate 28. The base end apparatus 32 and the structural base member are attached to the housing and support device by a fastener 48. The upper portion of the main spike is threaded 33 permitting the base plate 28 to be selectively moved and adjusted upward or downward and fixed in place by threaded nuts 34, thereby raising or lowering the decoy body.

Figure 6:
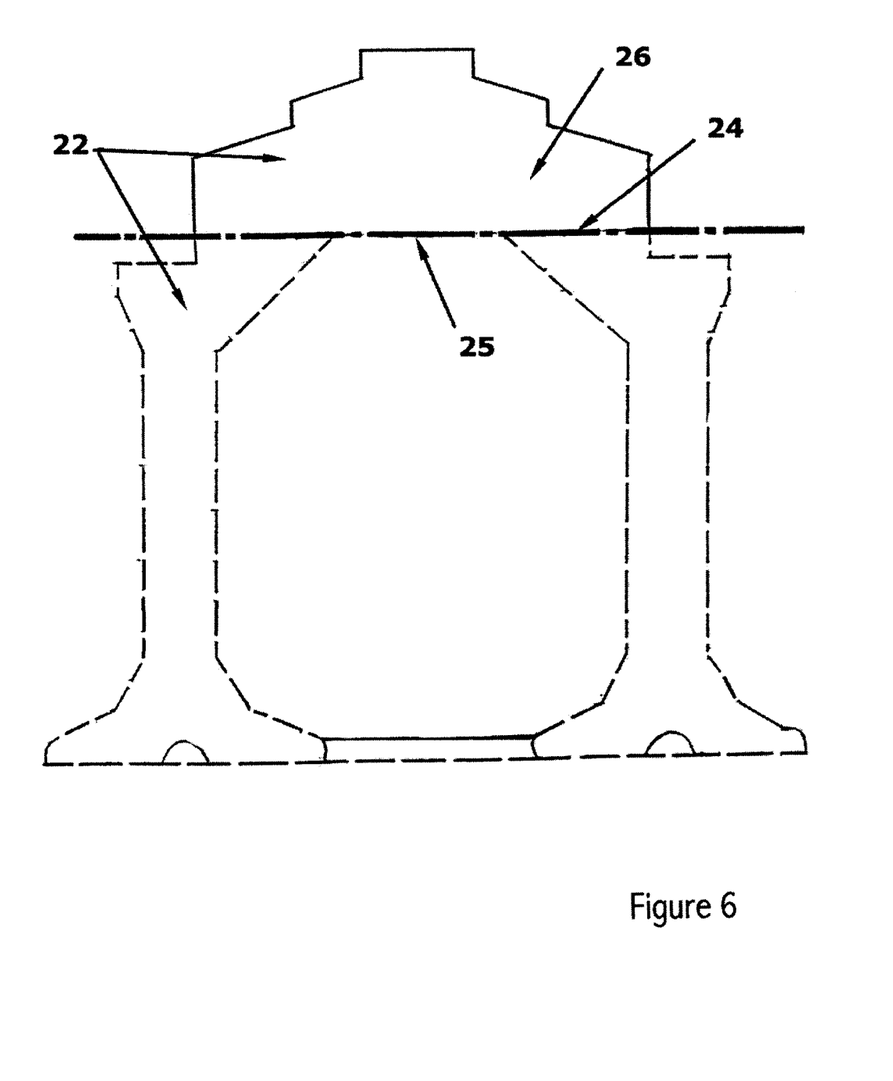
FIG. 6 is an elevational view of detachable and leg assembly with plug-in features.

A method of incorporating the oscillatory mechanism 37 in a plug-in assembly such as illustrated, by way of example, in (FIG. 6) creates a portable mechanism that provides animation to a bird decoy. For the sake of explanation, it may be pointed out in FIG. 6 that a plug-in leg assembly 22 of a full body decoy of prior art is modified by eliminating the legs and feet 24 portion resulting in a plug-in apparatus 26 having the plug-in features and having an opposing flat bottom surface 25. It will be understood by those skilled in the art that there is a sufficient amount of the plug-in features 26 adapted for plugging-in to the full body decoy remains.

The modified plug-in apparatus 26 is fixedly attached as illustrated in FIGS. 1, 2 and 3 to a mounting plate 45 mounted on the antifriction device 11. The antifriction device 11 as shown in FIG. 5 mounts over the top of the housing 36 and support device 36 and the interior of the antifriction device rotates on ball bearings 46 set in the top of the housing and support device 36.

Figure 7:
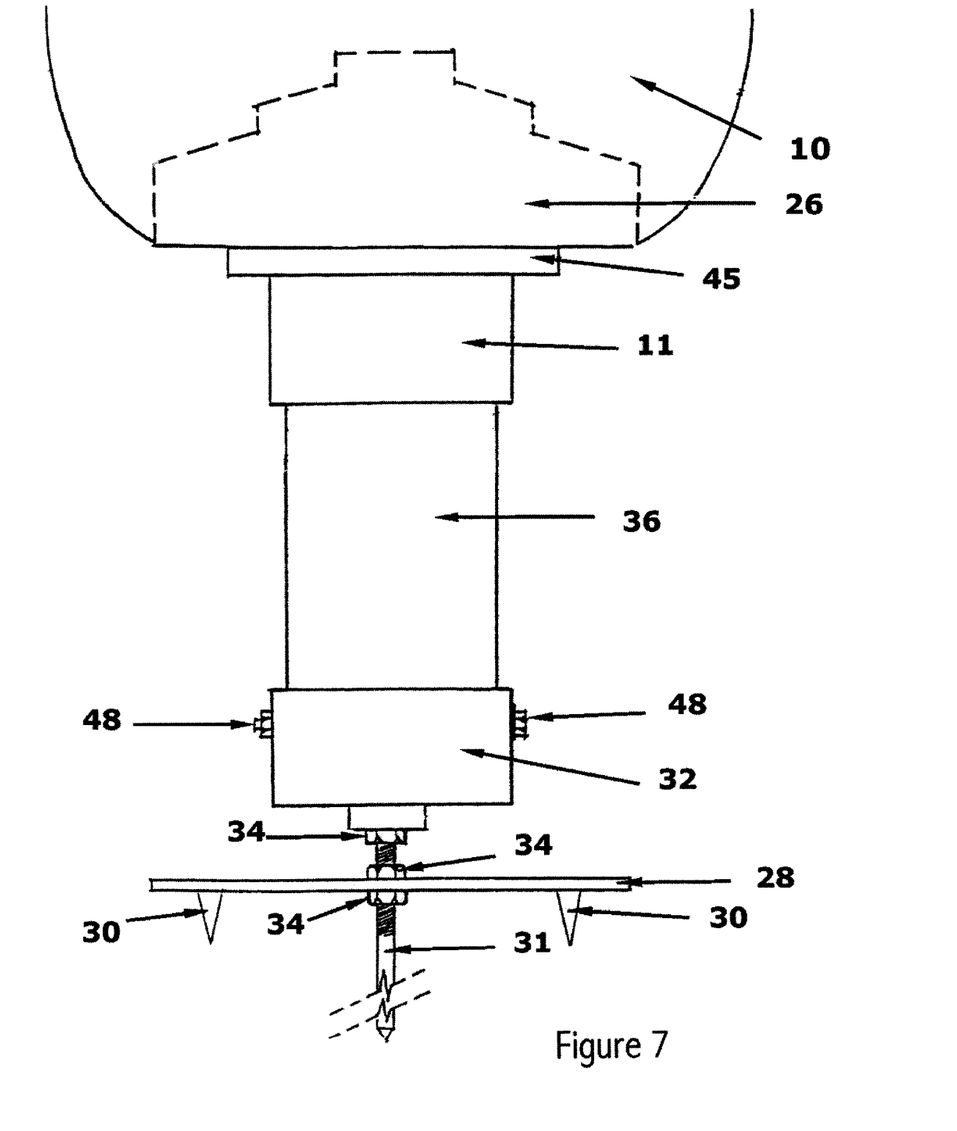
FIG. 7 is a front elevational view of the housing and support device plugged into a full body goose decoy in an upright position.

The rotating shaft 18 extends vertically through an opening 40 approximately in the center of the top end member 47 of the housing and support device 36 and an opening 52 in the center of the antifriction device 11. A geometrically-shaped member 19 attached at the terminus of the rotating shaft 18 inserts through the top of the antifriction device 11 into a slot 20 in the bottom of the mounting plate 45 which is attached to the bottom of the plug-in apparatus 26. The bearing device 11 is then mounted on a housing and support device 36, thereby transferring the oscillatory motion from the motor 16 to the plug-in apparatus 26. (FIG. 7) The end result is a modification of a stationary full body decoy 10 of prior art having plug-in leg assembly features to a decoy with oscillatory motion mimicking a bird in sentry or feeding positions. The plug-in apparatus 26 is of selective size and configuration depending on the particular conventional decoy model, and the oscillatory mechanism 37 as shown in FIG. 2 and 3, is thereby adapted to a variety of prior art conventional full body bird decoys with feet that detach. For the sake of explanation, it may be pointed out that said modified plug-in apparatus 26 fits the corresponding full body decoy.

Figure 8:
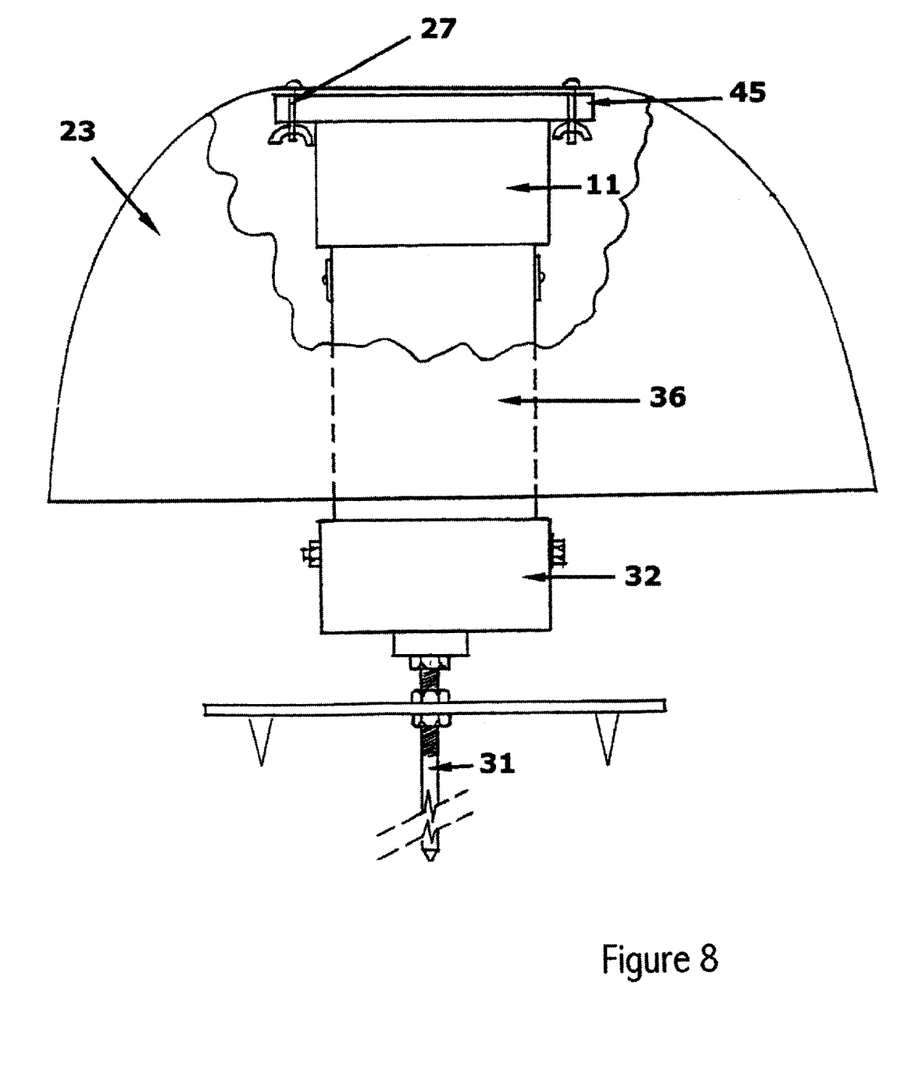
FIG. 8 is a front cross section of a shell decoy showing attachment of mounting apparatus, antifriction device and housing and support device with base stand.

In another method of incorporating the invention to a shell decoy 23, a mounting plate 45 secured to a antifriction device 11 and a housing and support device is attached inside a hollow or shell decoy in FIG. 8 not having plug in feet 27 at the approximate point of equilibrium. (FIG. 8) The base end apparatus 32 and mainspike 31 secured in the earth support the shell decoy 23 in a standing position. The oscillatory mechanism 37 described in FIG. 2 and 3 is employed in this embodiment. (FIG. 8)

Figure 9A:
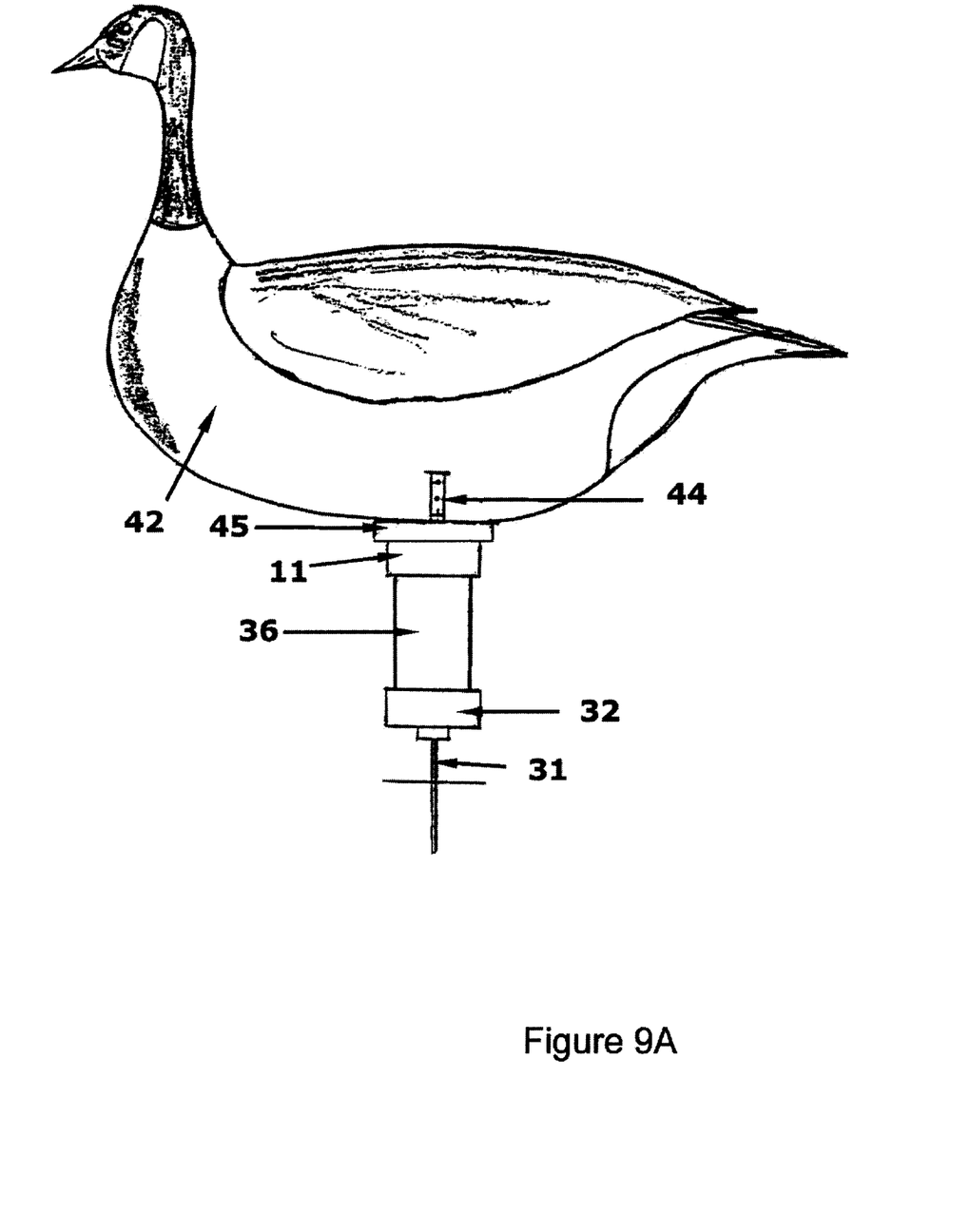
FIG. 9 is a side elevational view of a silhouette decoy attached to the mounting plate, antifriction device and housing support device.
Figure 9B:
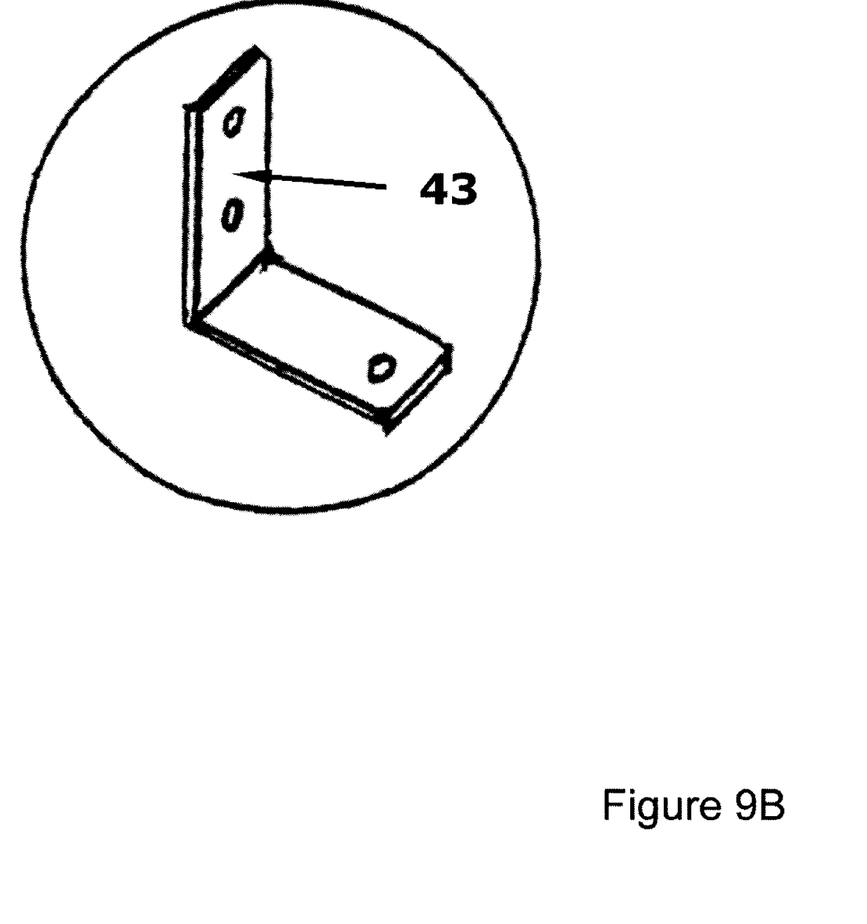

In another method of incorporating the oscillatory mechanism 37 contained in a housing and support device 36 described in FIGS. 2 and 3 are attached, as illustrated in FIG. 9, to a silhouette decoy 42, thereby creating an animated decoy. In an embodiment of the invention includes an L-shaped device 43 which is securely attached to the mounting plate 45 (FIGS. 2,3,5 and 9) which is attached to a antifriction device 11 and in turn to a housing and support device 36. The L-shaped device 43 is then attached fixedly to the bottom of the silhouette d(coy at the point of equilibrium in (FIG. 9). The oscillatory mechanism 37 described in FIG. 2 and 3 are employed in this embodiment. The base end apparatus 32 and main spike 31 support the decoy in a standing position.

We claim:

1. A decoy assembly comprising,
   a decoy having a hollow interior,
   a removable plug-in apparatus,
   said decoy having an opening in a lower portion configured to receive said removable plug-in apparatus,
   said removable plug-in apparatus inserted into said opening to provide connection to said decoy body,
   a housing having a top end and a bottom end,
   said housing attached to said plug-in apparatus with an anti-friction device mounted between said plug-in assembly and said top end of said housing,
   a motor including means for producing and imparting rotational energy and motion, a rotating shaft connected to said motor,
a power supply electrically connected to said motor,
a switch for activating said power supply and motor,
a sensor for transforming rotational movement of said motor to oscillatory movement thereby selectively oscillating said rotating shaft, whereby variable rates and degrees of oscillation are imparted to said rotating shaft,
said motor, said power supply, said switch and said sensor are mounted in said housing, said rotating shaft connected to said plug-in apparatus through holes in said housing top end and said anti-friction device, whereby oscillatory motion is imparted to the decoy body,
a base member having means for enclosing a bottom end of said housing, wherein said base member may be removed for access to said motor, said power supply, said sensor and said switch, said base member having means for changing the elevation of said decoy, whereby the decoy is adjustable upward or downward,
said base member having means for securing said decoy assembly to the ground.

2. The decoy assembly of claim 1, comprising,
said switch includes means for receiving radio waves and a remote control device having means to send radio waves adapted to activate said switch.

3. The decoy assembly of claim 1, comprising,
said anti-friction device selected from a group consisting ball bearings, roller bearings and plain bearing.

4. A decoy assembly comprising,
a decoy having a hollow interior,
a removable plug-in apparatus,
said decoy having multiple openings in a lower portion configured to receive said removable plug-in apparatus,
said removable plug-in apparatus inserted into said openings to provide connection to said decoy body,
a housing having a top end and a bottom end, said housing attached to said plug-in apparatus with an anti-friction device mounted between said plug-in apparatus and said top end of said housing,
a motor including means for producing and imparting rotational energy and motion,
a rotating shaft connected to said motor,
a power supply electrically connected to said motor,
a switch for activating said power supply and motor,
a sensor for transforming rotational movement of said motor to oscillatory movement thereby selectively oscillating said rotating shaft, whereby variable rates and degrees of oscillation are imparted to said rotating shaft,
said motor, said power supply, said switch and said sensor are mounted in said housing, said rotating shaft connected to said plug-in apparatus through holes in said housing top end and said anti-friction device,
a base member having means for enclosing a bottom end of said housing, wherein said base member may be removed for access to said motor, said power supply, said sensor and said switch, said base member having means for changing the elevation of said decoy, whereby the decoy is adjustable upward or downward,
said base member having means for securing said decoy assembly to the ground.

5. The decoy assembly of claim 4, comprising,
said switch includes means for receiving radio waves and a remote control device having means to send radio waves adapted to activate said switch.

6. The decoy assembly of claim 4, comprising,
said anti-friction device selected from a group consisting ball bearings, roller bearings and plain bearing.

7. A decoy assembly comprising,
a decoy having a shell body,
a plug-in stand apparatus,
said decoy having a recessed opening in an interior portion configured to receive said plug-in stand apparatus,
a housing having a top end and a bottom end, said housing attached to said plug-in stand apparatus with an anti-friction device mounted between said plug-in apparatus and said top end of said housing,
a motor including means for producing and imparting rotational energy and motion,
a rotating shaft connected to said motor,
a power supply electrically connected to said motor,
a switch for activating said power supply and motor,
a sensor for transforming rotational movement of said motor to oscillatory movement thereby selectively oscillating said rotating shaft, whereby variable rates and degrees of oscillation are imparted to said rotating shaft,
said motor, said power supply, said switch and said sensor are mounted in said housing, said rotating shift connected said plug-in apparatus through holes in said housing top end and said anti-friction device, whereby oscillatory motion is imparted to the decoy body,
a base member having means for enclosing a bottom end of said housing, wherein said base member may be removed for access to said motor, said power supply, said sensor and said switch, said base member having means for changing the elevation of said decoy, whereby the decoy is adjustable upward or downward,
said base member having means for securing said decoy assembly to the ground.

8. The decoy assembly of claim 7, comprising,
said switch includes means for receiving radio waves and a remote control device having means to send radio waves adapted to activate said switch.

9. The decoy assembly of claim 7, comprising,
said anti-friction device selected from a group consisting ball bearings, roller bearings and plain bearing.

10. A decoy assembly comprising,
a decoy body having an opening in a lower portion,
a removable plug-in apparatus,
said removable plug-in apparatus inserted into said opening,
a housing having a top end and a bottom end,
said housing attached to said plug-in apparatus with an anti-friction device mounted between said plug-in apparatus and said top end of said housing,
a motor including means for producing and imparting rotational energy and motion,
a rotating shaft connected to said motor,
a power supply electrically connected to said motor,
a switch for activating said power supply and motor,
a sensor for transforming rotational movement of said motor to oscillatory movement thereby selectively oscillating said rotating shaft, whereby variable rates and degrees of oscillation are imparted to said rotating shaft, said motor, said power supply, said switch and said sensor are mounted in said housing, said rotating shaft connected to said plug-in apparatus through holes in said housing top end and said anti-friction device, a base member having means for enclosing a bottom end of said housing, wherein said base member may be removed for access to said motor, said power supply, said sensor and said switch, said base member having means for changing the elevation of said decoy, whereby the decoy is adjustable upward or downward, said base member having means for securing said decoy assembly to the ground.

11. The decoy assembly of claim 10, comprising, said switch includes means for receiving radio waves and a remote control device having means to send radio waves adapted to activate said switch.

12. The decoy assembly of claim 10, comprising, said anti-friction device selected from a group consisting ball bearings, roller bearings and plain bearing.

* * * * *